United States Patent [19]
Blanchester

[11] Patent Number: 6,141,438
[45] Date of Patent: Oct. 31, 2000

[54] METHOD AND CONTROL DEVICE FOR DOCUMENT AUTHENTICATION

[76] Inventor: Tom F. Blanchester, Gavlegatan 1 3tr, S-113 30 Stockholm, Sweden

[21] Appl. No.: 09/362,084

[22] Filed: Jul. 28, 1999

Related U.S. Application Data

[63] Continuation of application No. 08/700,420, filed as application No. PCT/SE95/00179, Feb. 21, 1995, abandoned.

[30] Foreign Application Priority Data

Feb. 28, 1994 [SE] Sweden ................. 9400686

[51] Int. Cl.⁷ ..................................... G06K 9/00
[52] U.S. Cl. .................... 382/140; 382/118; 382/287; 705/44; 235/380
[58] Field of Search ................. 382/100, 135, 382/270, 137–140, 124–125, 115–118, 287–288, 209, 214, 216–217, 305–306, 294, 317, 312; 700/83; 705/41–44; 235/379–382; 380/51; 283/71–75; 340/825.3–825.34; 358/403–404, 456; 707/1–5; 713/186

[56] References Cited

U.S. PATENT DOCUMENTS

| | | | |
|---|---|---|---|
| 4,179,686 | 12/1979 | Bonicalzi | 382/115 |
| 4,201,978 | 5/1980 | Nally | 382/140 |
| 4,432,282 | 2/1984 | Jurinak | 101/350.5 |
| 4,582,986 | 4/1986 | Stockburger | 235/454 |
| 4,811,408 | 3/1989 | Goldman | 382/115 |
| 4,907,096 | 3/1990 | Stansfield | 358/456 |
| 5,168,532 | 12/1992 | Seppi | 382/270 |
| 5,206,917 | 4/1993 | Ueno | 382/288 |
| 5,321,765 | 6/1994 | Costello | 382/125 |
| 5,410,609 | 4/1995 | Kado | 382/118 |
| 5,420,924 | 5/1995 | Berson | 713/186 |
| 5,432,864 | 7/1995 | Lu | 382/118 |
| 5,469,512 | 11/1995 | Fujita | 382/118 |
| 5,488,725 | 1/1996 | Turtle | 707/5 |
| 5,799,092 | 8/1998 | Kristol et al. | 380/51 |
| 5,838,814 | 11/1998 | Moore | 382/115 |

*Primary Examiner*—Leo H. Boudreau
*Assistant Examiner*—Ishrat Sherali
*Attorney, Agent, or Firm*—Pillsbury Madison & Sutro LLP

[57] ABSTRACT

A document authentication control device has a card positioning device with a document insertion region, an optical scanner, a data processor that receives data from the optical scanner, a database for storing processed optical image data, and a display screen for displaying document, authentication, and other data. The data processor correlates an image region of a document and a reference region of the document to corresponding image and reference regions of the document retrieved from the database, thereby determining the authenticity of the document. The reference region is a region of the document that is spaced away from the image region of the document.

21 Claims, 3 Drawing Sheets

METHOD AND CONTROL DEVICE FOR DOCUMENT AUTHENTICATION

This is a Continuation of application Ser. No. 08/700,420 filed Dec. 17, 1996 now abandoned which is a 371 of PCT/SE95/00179, filed Feb. 21, 1995.

FIELD OF THE INVENTION

The present invention relates to a method and to a control device for reading and authenticating identity documents and valuable documents, and more particularly to reading and authenticating identity documents and valuable documents that are provided respectively with an image of the person to whom the identity document refers or an image of a pattern which is significant to a valuable document.

DESCRIPTION OF RELATED ART

It is a well known problem that identity documents and valuable documents are the subject of forgery. With the commercial advent of the colour copier, it became relatively easy to produce forgeries quickly that are of sufficient high quality to escape visual examination. In an attempt to prevent forgeries or to make forgeries more difficult to achieve, the manufacturers and publishers of valuable documents have provided such documents with, e.g., UV print, complicated patterns and engravings, watermarks, metal filaments, photographs, magnetic code storage media, different laminates, relief prints, etc. In spite of all the advanced methods available for protection against forgeries, valuable documents are forged successfully every day. One of the reasons for the success enjoyed by forgers is the human factor, i.e. stress situations in combination with the fact that the forgeries are cleverly done and require an expert to decide the authenticity of the document concerned, which expert, normally the person carrying out the identification or valuable-document control, cannot always be relied upon to make a thorough examination. As mentioned, many of the forgeries are of very high quality. The reason for this high quality may be found in the common access to high technology in the home and in the work place, and the breakthrough of computer technology. The person carrying out identity checks and authenticity checks therefore requires access to control means other than relying on visual examination, which at present time may be relatively expensive and also doubtful with regard to the reliability of existing control devices. Furthermore, many of the existing control devices are unwieldy, i.e. heavy and permanent fixtures. It will also be more usual in the future for all identification documents, such as credit cards, to include a photograph of the owner. It is also desirable that tradesmen and storekeepers who offer so-called servo-services, i.e. payment by credit card via a control device, are able to contact a data base for verification of credit worthiness together with the issue of a printed receipt for the cost of the service used.

SUMMARY OF THE INVENTION

The problems associated with authenticity controls are many and are liable to have serious consequences for authorities, banks, tradesmen, companies, etc. The object of the present invention is to avoid these problems by virtue of a portable control device and a unique and difficultly copied identification method. Another object of the invention is to enable an identification control to be carried out at a variable communication rate, with the limitation that reliability is maintained.

The control device according to this invention is connected to at least one data base which contains information relating to the document concerned. More specifically, the invention relates to a preferably portable control device for reading identity documents which include a photograph of the person to whom the document refers, or for reading such valuable documents as banknotes, checks, forms (bank forms and Post Office forms, etc.), credit cards, smart cards, key cards, pass cards, and so on, having a specific pattern, signature, picture, image or photograph, by means of a method according to the invention. The method and the device are intended to make it difficult or impossible to pass forged documents through authenticity checks.

These and other objects are achieved with a method and a control device having the characteristic features set forth in the following method and apparatus claims.

The invention is based on the realization that the raster points on an image or picture, e.g. a photograph or pattern, are different for different images. The raster points are scanned with the aid of an optical technique, e.g. through the medium of a scanner, CCD technique (Charge Coupled Device), etc., and, e.g., a facial photograph becomes a unique "thumbprint", since the position and tone of each raster point is dependent on the occasion on which the photograph was taken, the distance of the subject from the camera when taking the photograph, the light setting when the photograph was taken, the film development method used, the actual printing process and the centering of the photograph in the place intended therefor. When taken together, these features make it almost impossible to replace a facial photograph on an identity document when the original document is stored electronically and it is possible to make a comparison with a suspected forgery in accordance with the inventive method described in more detail here below. The reliability of the invention identity control method can be shown by the fact that it is just as difficult for a person to replace his/her facial picture on his/her own identification document with a new facial picture as it would for an unknown person to replace this facial picture with his/her own picture. Although this example has no relevance in practice, it does, nevertheless, show the security afforded by the inventive method.

The method practiced with the aid of the inventive control device comprises scanning either completely or partially the raster points of an image on an identity document or valuable document with regard to the reflected light-intensity with the aid of an optical device, e.g. with the aid of a scanner or CCD device. According to one alternative, an adequately large part of the raster points are also read from the identification signs on the document, for instance a personal identification number or the serial number of a banknote, etc. By adequately large part is meant here that it shall be possible to limit the search area in a data base, such that imaging, which also constitutes an identity in this regard, will find the correct place in a data base. For instance, by scanning the date of birth from a document, e.g. year '60, the search area will perhaps have been limited to an extent which will enable the intended place in the data base to be found sufficiently quickly for a comparison or new registration to be made, with the aid of solely the image or picture as the identity. Further limitations can otherwise be made. The necessity of this limitation will depend on the extent of the information contained in the data base; if the data base contains only a small register of documents, it will suffice for the scanned image to be used as identification for localizing the place in the data base. According to one alternative of the invention, a necessarily large part of an identity is entered by the control device operator through an internal input means, so that the location of the scanned document in the data base can be found with the aid of imaging, wherewith no identification is read from the document. According to another alternative, the operator gives the information required to immediately locate the place in the data base, without the aid of imaging. If necessary, a further piece of the document is scanned outside the image or identification marks so as to obtain a reference, when no reference is included in the image or the identity. For instance, not all of the document is scanned, but only the intensity of the light reflected from the image at the raster points, optionally from an identity, and a reference is taken-up. Other information on the document is entered through the medium of an external writer, primarily when newly registering a previously unregistered original document. This other information may include a name, address, special serial number, etc., provided that these do not constitute an identity. The reference serves as a position indicator or as a reference to the scanned document in a data base, i.e. a comparison of a controlled document with a corresponding document in the data base reveals the location of the image with associated information, wherever corresponding values from the control document and the document imaged in the data base are compared (correlated).

After scanning a control document that has been imaged in picture elements, i.e. pixels, by the optical device, the image is divided selectively into large sub-areas which include at least two pixels. These sub-areas may have any chosen form, i.e. may be rectangular, square, etc. The shape of these sub-areas is limited to some extent by the requirement of an effective coordinate system, not necessarily a cartesian system. The scan is digitalized so that each picture element or pixel will obtain a bit sequence contingent on the intensity of the light reflected from the pixel. When the scan is concerned with a new registration, i.e. the registration of a new document in a data base, the whole of the scan is stored in the intended location in the data base, through the medium of its identity. On the other hand, when the scan is concerned with checking a registered document, information which concerns the document is taken from the data base and used together with the control document information for digital comparison of the image on a bit level.

According to the invention, there are several preferred methods of making comparisons on a bit level. For example, a preferred number of sub-areas may be chosen automatically for comparison with corresponding sub-areas in the data base with regard to the controlled document, for instance a sub-area of a facial photograph which includes an eye, and a sub-area which includes the mouth, whereafter non-selected sub-areas are sorted out and the chosen sub-areas are compared with corresponding areas in the data base, pixel by pixel, to obtain a comparison value for each selected sub-area. It will be noted that the number of sub-areas chosen and the sub-areas chosen for comparison in a data base may be chosen freely. This enables communication in the comparison process to be minimized, i.e. enables the process to be quickened up. It may suffice merely to compare one sub-area, since the accuracy of the comparison resides in the number of pixels included in a sub-area. The communication may also be effected in a compressed or packed form, in accordance with techniques known from the computer and telecommunications field.

A comparison may also be effected by summing the comparison values (the correlation values) obtained for the chosen sub-areas in accordance with the first method, so as to obtain a comparison distribution or division which is compared with the distribution in the data base for corresponding documents, so as to obtain a comparison value. An example of how this distribution or division can be obtained is given below.

```
double Image_Comparison(unsigned char**ImageRef,unsigned char
**Image,int
Ncols,int Mrows)
{
double success,margin:
        /* Image Center detection */
        /* An algorithm for defining where the image weight point
        lies can be placed here */
        /* Image comparison */
        success=0.0;   /* Flag for valid pixels */
        margin=5       /* Uncertainty margin for pixel fitting */
        for(i=0;i<Ncols,j++)
                {
                for(j=0;j<Ncols,j++)
                        {
                        if(fabs(ImageRef[i] [j]-Image [i] [j] <
                        margin)
                                success +=1.0;
                        }
                }
        return( (double) (success/Mrows/Ncols));
        /* return percentage of successes between 0 and 100% */
}
```

The last notation in the program constitutes the comparison division given in percent. ImageRef is the data base stored value of corresponding pixels of a scanned document. Success + represents an increase (summation) of obtained similarities between pixels.

In order for the inventive method, performed via a control device, to function in the manner intended irrespective of light variations of the light source of the optical device, the recorded intensity of the light reflected from the pixels will preferably be normalized with a reference light intensity.

The actual comparison process (correlation process) for obtaining the aforesaid comparison values will preferably be effected through the medium of a subtraction operation, which need not necessarily be a pure subtraction but a digital subtraction, for example through the medium of a two-complement method, which is actually an addition. Other equivalent subtractions known in digital technology are also conceivable.

The comparison values obtained with one of the two aforedescribed methods are compared with a security level to determine the reliability of the obtained comparison values. After establishing a security level, a value is determined to show whether or not identity exists, i.e. through the medium of a probability measurement or some appropriate sign combination, such as + and −, etc.

The method is effected with the aid of a control device, summarized below.

The control device used to perform the method of scanning identity documents and valuable documents includes an optical device, such as a scanner or CCD device for recording a scanned image. The control device also includes an analogue signal sampler, an analogue/digital converter, control logic, and a processor for controlling and monitoring the device via data buses. The device also includes data and telecommunications means for external communication, e.g. a modem, for communication via computer networks or tele-networks, having data bases intended for authenticity checks, for instance. The arrangement may also include its own memory units for internal data base storage, such as a ROM memory, RAM memory, different sorts of PROM memory, a hard disk, CD disk, magnetic storage medium, PCMCIA card (Personal Computer Memory Card International Association card), etc. An external input device, such as a keyboard, for entering in a data base additional information relating to scanned images may be connected to the control device. The control device may be mains or battery operated and is provided with a mains cable terminal and with a terminal for external data and telecommunications connection and for connecting-up a printer. The control device will include at least one image and character display screen, e.g. an LCD display screen, although it will preferably include two such display screens. One of the screens reproduces the image of a scanned document and the other screen reproduces other information associated with the document and registered in a data base through the external input means (e.g. writer). The control device also includes a keypad with which the device operator is able to select different device functions or to cause the device to carry out desired commands. Variations in the light from the light source of the optical device can be excluded by connecting to the control logic a photodiode which functions to detect light intensity recorded from a document, in a feedback loop which leads to evaluating means in the control logic, wherein the detected light intensity is used as a reference to normalize the light intensity. Light variations can also be normalized by applying a reference grey scale on the document to be controlled or registered. The control device will preferably be a portable device and enclosed in a suitable casing, e.g. a plastic or metal casing, and provided with carrying handles and suitable feet made of soft material, such as rubber, felt, plastic, etc. The screen or screens on which the supplementary information of an image entered through by the input writer is reproduced may be guarded by a screen guard, to prevent the screen from being seen by unauthorized persons.

According to a development of the invention, the control device includes means for entering information that is scanned from a valuable document into the storage medium of the actual document itself into its storage medium, therewith enabling the document to be used as a key card to barred localities, i.e. the electronic lock scans the key card photograph and reads in the information from the storage medium and compares this information with the information read-out in accordance with the aforedescribed method. Alternatively, in the case of pass cards which lack an image of the owner, information is taken from the storage medium and a picture of the owner is shown on the display screen of the control device for identity control purposes. The control device may also include means for checking ultraviolet print.

Although devices which include the aforesaid units and employ the aforedescribed techniques are known to the art, the present invention distinguishes from what is earlier known within this area of technology, by virtue of the device being used to effect the inventive method.

The manner in which the control device enters a new registration into a data base and the manner in which a comparison is made with a document that is already registered in a data base will now be described.

For instance, a new registration can be entered in an external or internal data base by scanning the image to be registered with the control device in accordance with the aforedescribed method. As before mentioned, only the image is scanned, or a part of said image, optionally together with an identity and reference. Consequently, it is desirable to supplement the data base with additional information concerning the document to be registered. This further information, or supplementary information, is registered via the external write input, e.g. a keyboard. This supplementary information may have the form of a name, a personal identification number, eye colour, height, hair colour, signature, etc. In different areas of use, for instance the aforesaid servo-services, doctor visits, library visits, employee company registers, bank accounts, etc., the supplementary information can be expanded with such data as credit card blocked, borrowed video film not returned, latest visit Oct. 3, 1992, unpaid debt SEK 1,000, payment complaints, etc. For instance, an ID card with a corresponding ID card registered in a data base, the control is carried out by inserting the card in card insertion means with which includes a card positioner, whereafter an operator inserts some identity of the location of the intended location in the data base, optionally through a keypad. The control is carried out in accordance with the aforedescribed method, with the aid of the processor and control logic which deal with coordinate transformation and the establishment of communication with comparison units. Upon completion of the control procedure, the photograph of the ID owner is reproduced on one of the display screens, while the other display screen displays whether the ID card is genuine or false, together with the supplementary information stored in the data base concerning the ID owner. If the operator wishes, and has the authority, the operator can now insert additional information through the external input device.

Alternatively, the optical device or the card positioner can be moved to a correct position on the image with the aid of the reference on a document, in accordance with a coordinate transformation, and a new can can be carried out, this scan now falling in the correct position with regard to a corresponding document in the data base. Preferably, this transformation will be effected with the aid of the control logic, without influencing the state or position of the optical device or the card receiver.

BRIEF DESCRIPTION OF THE DRAWINGS

The invention will now be described in more detail with reference to exemplifying, non-limiting embodiments thereof and also with reference to the accompanying drawings in which.

DETAILED DESCRIPTION OF THE PREFERRED EMBODIMENT

Figure 1:
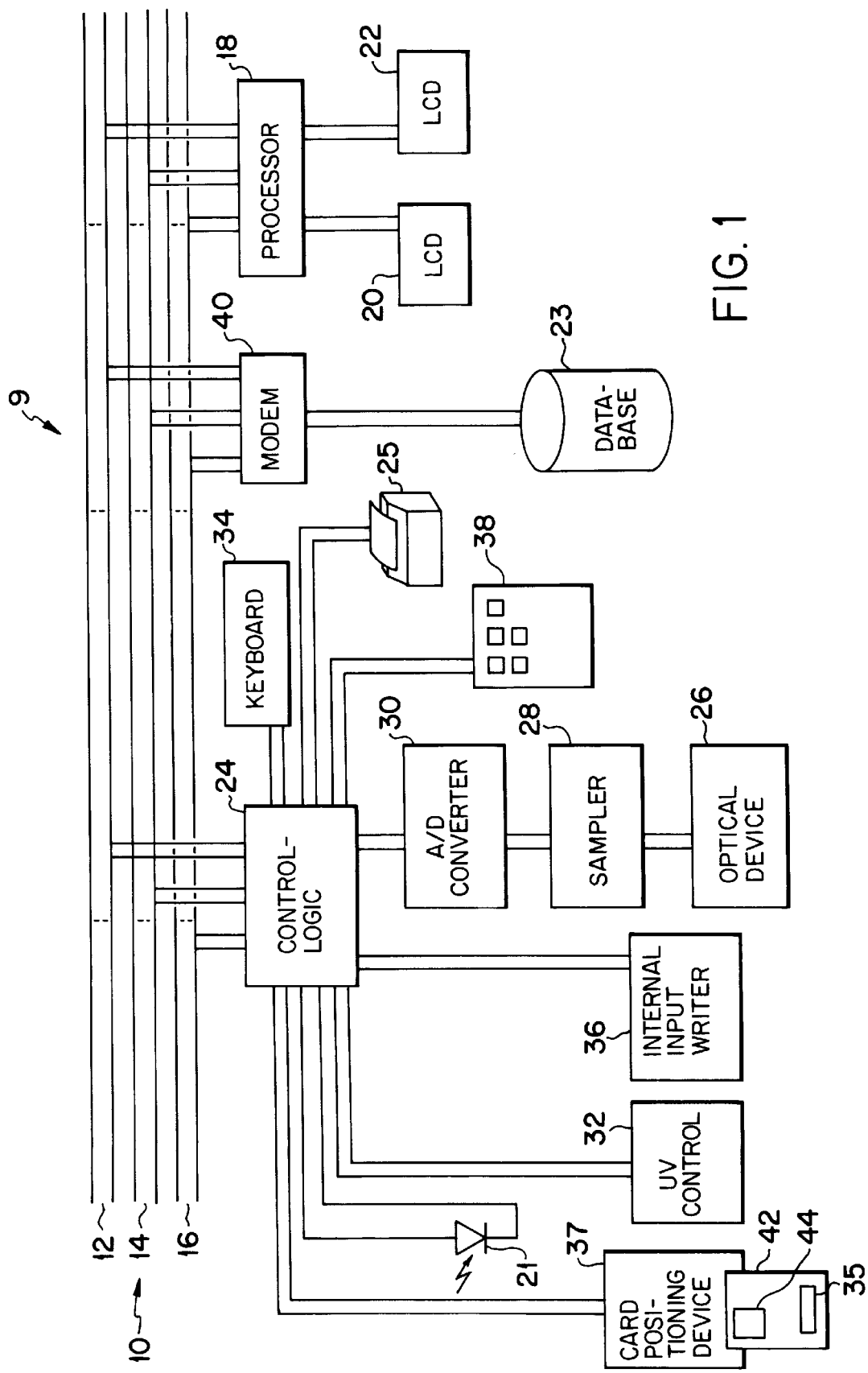
FIG. 1 is a block schematic illustrating a control device.

FIG. 1 is a block schematic showing the construction of one conceivable embodiment of an inventive control device 9. The communication bus 10 includes a control bus 12, an address bus 14 and a data bus 16. Connected to the communication bus 10 is one or more processors 18 which controls/control and monitors/monitor the functions and commands of the control device 9. The processor 18 has two LCD display screens 20 and 22 connected thereto. The screen 20 reproduces the image of the document whose genuineness is being checked, while the other screen 22 reproduces supplementary information from a queried data base 23 and also whether or not the document is authentic. Also connected to the bus 10 is a device which includes control logic 24 which deals with the functions of the device 9 for authentication of the document, normalization of the light intensity with a photodiode 21, sampling, digitizing coordinate transformation, data and telecommunications, printout with the aid of printer 25, and other controls under the supervision of one or more processors 18. In turn, the logic 24 is connected to an optical device 26 via a sampler 28 and an analog/digital converter (A/D) 30. The logic 24 is also connected to a device for UV control 32 of ultraviolet print, a keyboard 34 for inserting supplementary information concerning an authenticity controlled document or newly registered document in a data base 23, an internal input writer 36 for writing-in information from a document 42 on document-mounted storage medium 35, a card positioning device 37 with an ID card 42 including an image 44 and a storage medium 35, and a button set 38 by means of which the device operator can choose and enter the functions or commands to be included in the authentication control. Finally, there is also provided a modem 40 for data transfer and telecommunication with external units connected to the bus 10 and a data base 23.

The optical device 26, which may be a scanner, CCD device, etc., records the intensity of the light reflected by a scanned document from the picture elements in the raster or matrix. The light intensity signal from the device 26 is normalized, sampled, quantified and converted from an analogue signal to a digital signal in the A/D converter 30, whereafter the logic 24 performs a coordinate transformation of a recorded image and ensures that a new registration or a comparison is effected automatically, or in accordance with instructions entered by an operator through the button set 38 or the keyboard 34. It may be convenient to permit certain units, e.q. the control logic (24), the A/D converter, the sampler (28), the processor or processors (18) in the device to be included in an ASIC construction (Application Specific Integrated Circuit). With the exception of the control logic (24), these units may also be included as units in the control logic (24) in the case of a typical discrete circuit board construction.

Because one of normal skill in this art will know how a data communications device such as the device 9 functions and how the various units in the device communicate, the methods of procedure will not be described in this document. As before mentioned, the illustrated embodiment is only one of many conceivable embodiments of the control device 9, and the invention is therefore not limited to this particular device.

Figure 2:
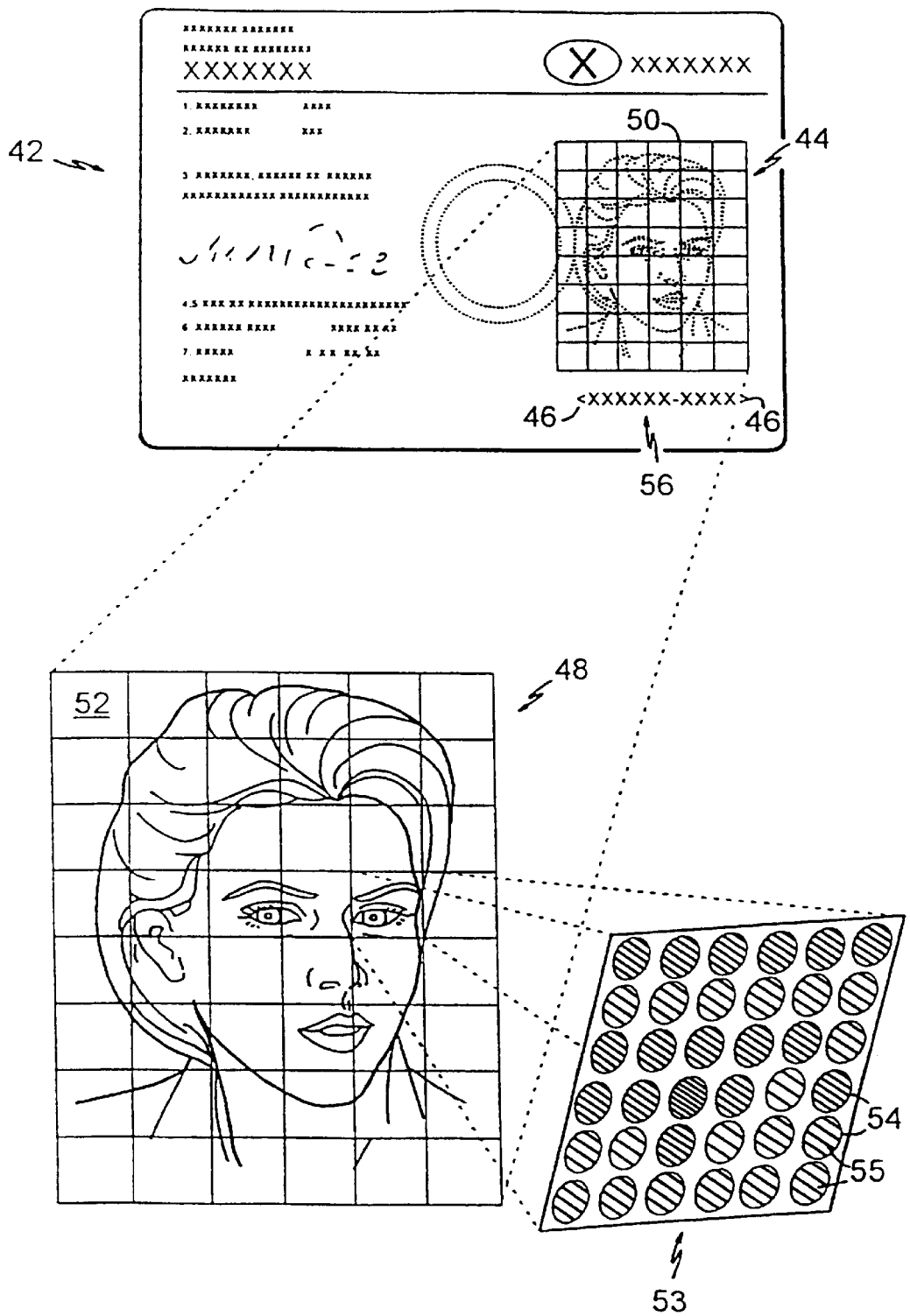
FIG. 2 illustrates an example of an ID card and shows examples of chosen sub-areas and associated pixels.

FIG. 2 illustrates an example of an ID document. The illustrated document is a driving license 42 having a facial photograph 44 of the owner, and being shown in a simple design. The photograph 44 is shown enlarged at 48 beneath the driving license 42, so as to more easily illustrate a division of the photograph into sub-areas 50, in the illustrated case into 48 squares referenced 52. The square 53 which includes an eye has also been enlarged adjacent the sub-areas 50. Each of the squares has a coordinate sign (1, 1), (1, 2) . . . , and each square 52 includes a plurality of raster points or matrix dots (not shown). The intensity of the light reflected by the raster points is taken-up by the pixel elements 54 belonging to this square, in the optical device 26. The illustrated example includes forty-eight squares 52, and the optical device 26 is comprised of 512·512 =262144 pixels 54, meaning that each square 52 includes about 5461 pixels. Working on the basis of a CCD matrix of 512·512 pixels, it is possible to achieve an accuracy of about 15 $\mu$m on 7.5 cm with a CCD matrix of 512 columns, these columns having been focused onto a square surface of 7.5 cm. Thus, a pixel will correspond to a surface measuring about 15 $\mu$m·15 $\mu$m. This is a rough calculation, since each column of the CCD matrix has a thin, passive transition column between each active column. Consequently, the sampling distance will be about 15 $\mu$m with an efficiency of between 50%–75%, depending on the transition column.

A pixel element grey scale coded in 8 bits (256 grey scale nuances) would correspond to a grey scale measurement of 0.01; a measurement used in the optic (so-called density) for light reflection, the higher the measurement, the darker the light with poorer reflectivity as a result, where 0.01 is a good measurement. In a non-compressed mode, a data transition of 512·512·8 bits would take about 13 seconds with a modem 40 that transmits at 19600 baud. In addition to speeding-up a new registration, an authenticity control can also be considerably speeded up by the method using the sub-areas, without packing. However, the inventive method and inventive device do not exclude the compression of transmitted information. FIG. 2 merely illustrates schematically some pixels 54, forty-eight pixels of about 5461 pixels, with varying recorded light intensity in the grey scale 55. For the sake of simplicity, only numbers from the decimal system are given in the example, although the device 9 may use a binary calculating method. Each pixel 54 and 55 is allocated through the control logic 24 with a bit sequence which corresponds to the intensity of the light reflected from fully scanned or partially scanned raster points. The optical device 26 also takes up the intensity of the light reflected from an identity 56, in this case date of birth, and from a reference 58, in the illustrated case one of the brackets (<>) embracing the identity, which are also digitalized with regard to the reflected light intensity. The birth date or birth number 56 refers to the correct location or file of the original document in a data base (23). Reference 58 is used to transform the coordinates of the facial photograph 44 with the sub-areas 50, effected by the control logic 24, so that the photograph will be positioned correctly in relation to a corresponding document in a data base, or a new registration. When the scan is completed, the control process is continued in accordance with the aforedescribed procedure.

Figure 3:
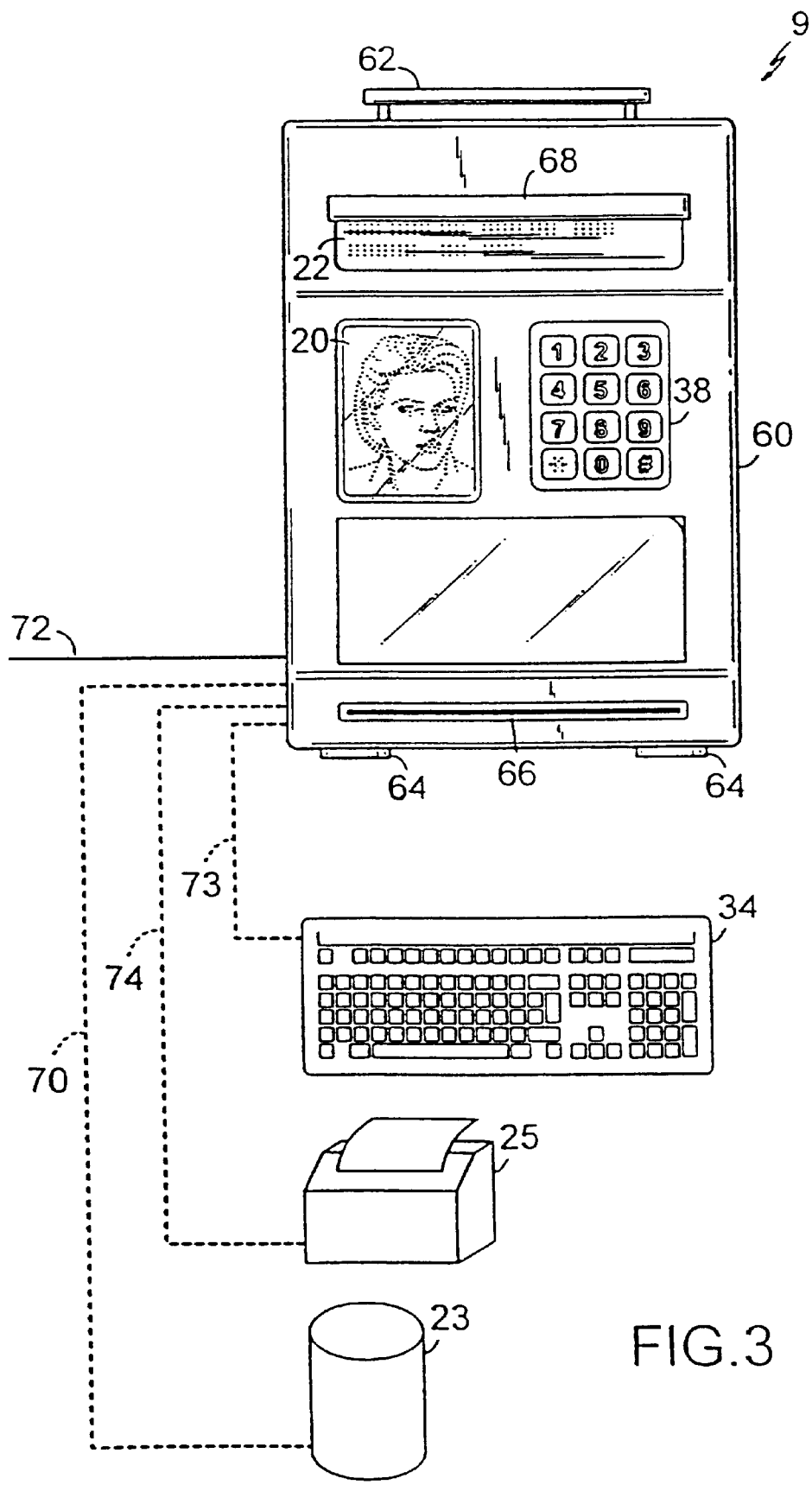
FIG. 3 is a schematic illustration of a control device with a case.

FIG. 3 illustrates a control device with a case. Those components that have correspondence in FIGS. 1 and 2 have been identified with the same reference signs.

The control device 9 is enclosed in a case 60 provided with handles 62, rubber feet 64, a display screen 20 for image reproduction, a display screen 22 for subsidiary information reproduction and for displaying the result of an authenticity control, a keybank 38, a recess or insert 66 for insertion of an identity document or valuable document, including a document positioning device (not shown), a guard 68 which prevents unauthorized viewing of the screen, cabling for telecommunication and data communication 70 with an external data base 23, mains cable 72, keyboard 34 for entering supplementary information, including cabling 73, and a printer 25 including cabling 74 which connects the printer to the device 9. The device operator inserts through the keyboard 38 information, for instance a year (e.g. year '60) so as to limit the search area in a data base (23) in accordance with the aforedescribed method. Alternatively, the method may be automatic so as to follow the entire procedure in accordance with a predetermined schedule, i.e. the choice of squares 52 for comparison with a data base stored document, among other things. The square 52 may be chosen randomly by a random generator, or a square may be chosen which includes a specific feature, such as the square (5.5) including the eye, etc. Those squares 52 which are not chosen for comparison are sorted out by the control logic 24.

The aforedescribed method also includes known techniques for contrast/light intensity compensation to improve image quality, therewith minimizing the effects of light variations. The raster points themselves constitute no problem, since light integration is effected over a wide area for each pixel. In addition, a pixel is compared with a reference pixel in a data base with a given tolerance level, a process which equalizes any irregularities. In the preferred embodiments, an image is scanned in a fixed position, meaning that no problems are encountered with enlargement through, e.g., an optic device which includes a macro-lens or objective. The described and illustrated method and device can be used for scanning both black-white print and colour print.

It will be understood that the present invention is in no way limited to the described and illustrated embodiments within the framework of embodiments that can be considered obvious to one of normal skill in the art of data and telecommunication and optics respectively, and that the scope of the invention is restricted solely by the following claims.

What is claimed is:

1. A method of scanning in a control device an identity document or valuable document which includes an image of the document owner, or an image of a pattern significant to the valuable document, wherein the control device is connected with at least one data base containing information concerning the documents, comprising:

scanning with the aid of said control device at least a part of the document which includes a part of the image or the whole of the image by recording in pixels with the aid of an optical device which includes a light source, the intensity of the light reflected by raster points of the image together with the intensity of the light reflected from raster points of at least one reference on the document, wherein the reflected light is recorded simultaneously, and wherein the recorded image includes information for reference to an original document in a data base;

dividing the recorded image into sub-areas which include at least two pixels wherein the scan is digitized and each of the pixels is given a bit sequence corresponding to the intensity of the light reflected for the pixels and coordinate-transforming the image such that the image will always have the same position in relation to said reference, this reference position also being the same for a corresponding document in at least one data base, wherein a document that is already stored in the data base is compared with a document whose authenticity is being checked or a non-registered document is newly registered in at least one data base automatically or manually via the control device, and wherein when scanning and comparing in a data base is relevant there is chosen prior to the comparison at least one sub-area or a limited number of sub-areas for verification with a corresponding sub-area or corresponding sub-areas related to the document in the relevant data base or data bases, whereafter non-selective sub-areas are sorted-out and, in the case of a new registration of the identity document or valuable document, the document is newly registered in at least one data base.

2. A method according to claim 1, wherein said intensity of the light is normalized with a reference intensity.

3. A method according to claim 1, wherein the scanned image is itself an identity which refers to a correct location in said database.

4. A method according to claim 3, wherein said scanning is with the aid of the optical device of an adequately large part of an identity on a document, such as to limit the search area in the data base to the identity.

5. A method according to claim 1, wherein said scanning is with the aid of the optical device of an adequately large part of an identity on a document, this identity referring to a correct location in a relevant data base.

6. A method according to claim 3, further comprising entering an adequately large part of the identity of the scanned document with the aid of a keypad on the control device, such as to limit the search area in the data base to the identity.

7. A method according to claim 1, further comprising inserting the identity of the scanned document with the aid of the keypad on the control device, this identity referring to a correct location in a relevant data base.

8. A method according to claim 1, wherein when making a comparison with a data base, the inserted light intensity values obtained with pixels from a selected sub-area or selected sub-areas is compared with the light intensity of the pixels in a corresponding sub-area or sub-areas of the document in a data base, with the aid of a subtraction operation so as to obtain a comparison value for the pixel.

9. A method according to claim 8, further comprising summing the light intensity of the pixels for each chosen sub-area, and comparing the light intensity division at each chosen sub-area with the light intensity division of a corresponding sub-area in the data base to obtain a comparison value for each chosen sub-area.

10. A method according to claim 8, further comprising comparing each value obtained by said subtraction with a safety level for determining reliability.

11. A method according to claim 8, further comprising determining a value to establish whether an identity exists or not.

12. A method according to claim 11, wherein the determined value is a probability measurement.

13. A method according to claim 1, further comprising inserting through an input writer connected to the control device supplementary image information in the data base, this information not being scanned in conjunction with entering the image.

14. A method according to claim 13, further comprising storing the digitized image with associated additionally inserted information in a storage medium present on the newly registered document.

15. A control device for scanning identity documents and valuable documents that include an image of the identity document owner or a pattern significant to a valuable document, comprising:

at least one data base which contains information concerning the documents;

at least one screen for reproducing the image and for reproducing data associated with information in said at least one data base;

at least one document insertion device which includes a document positioning device, a processor or processors for controlling and monitoring units present in the control device, communication bus lines, control logic including an analog-to-digital converter and sampler, function selection infeed component; an external data and telecommunications device, and a power supply, the control device includes an optical device having a light source, for scanning the whole image or a piece of said image, said scan including information for reference to an original document in a selected data base, and simultaneously record at each pixel the intensity of the light reflected from the raster points of the image together with the intensity of the light reflected by the raster points of at least one reference on the document, the device control logic functions to divide the recorded image in the sub-areas, said sub-areas including at least two pixels, the control logic of said control device effects the selection of at least one sub-area or a limited number of sub-areas prior to an authenticity check, the scan is digitized and each of the pixels is given a bit sequence corresponding to the intensity of the light reflected for said pixel, the control logic effects coordinate transformation of the image such that said image will always have the same position in relation to said reference, this reference position being the same for a corresponding document in the data base, and the control logic effects communication with at least one data base for an authenticity check or for newly registering a non-registered document in at least one data base.

16. A control device according to claim 15, wherein the control device is connectable to an external input writer for inserting supplementary information in images in a data base.

17. A control device according to claim 15, wherein means for writing into a storage medium provided on said document supplementary information relating to a document.

18. A control device according to claim 15, wherein the sub-areas are chosen in accordance with a random procedure or are chosen automatically by the control device in accordance with a predetermined, preferred procedure.

19. A control device according to claim 15, further comprising control means for the UV light control of documents provided with UV print.

20. A control device according to claim 15, wherein the control logic includes a photodiode connected to a feedback loop, for normalizing the intensity of the reflected light with the aid of means in the control logic.

21. A control device according to claim 15, wherein an identity document or valuable document includes a grey scale for calibrating the optical device and for normalizing the light intensity.

* * * * *